UNITED STATES PATENT OFFICE.

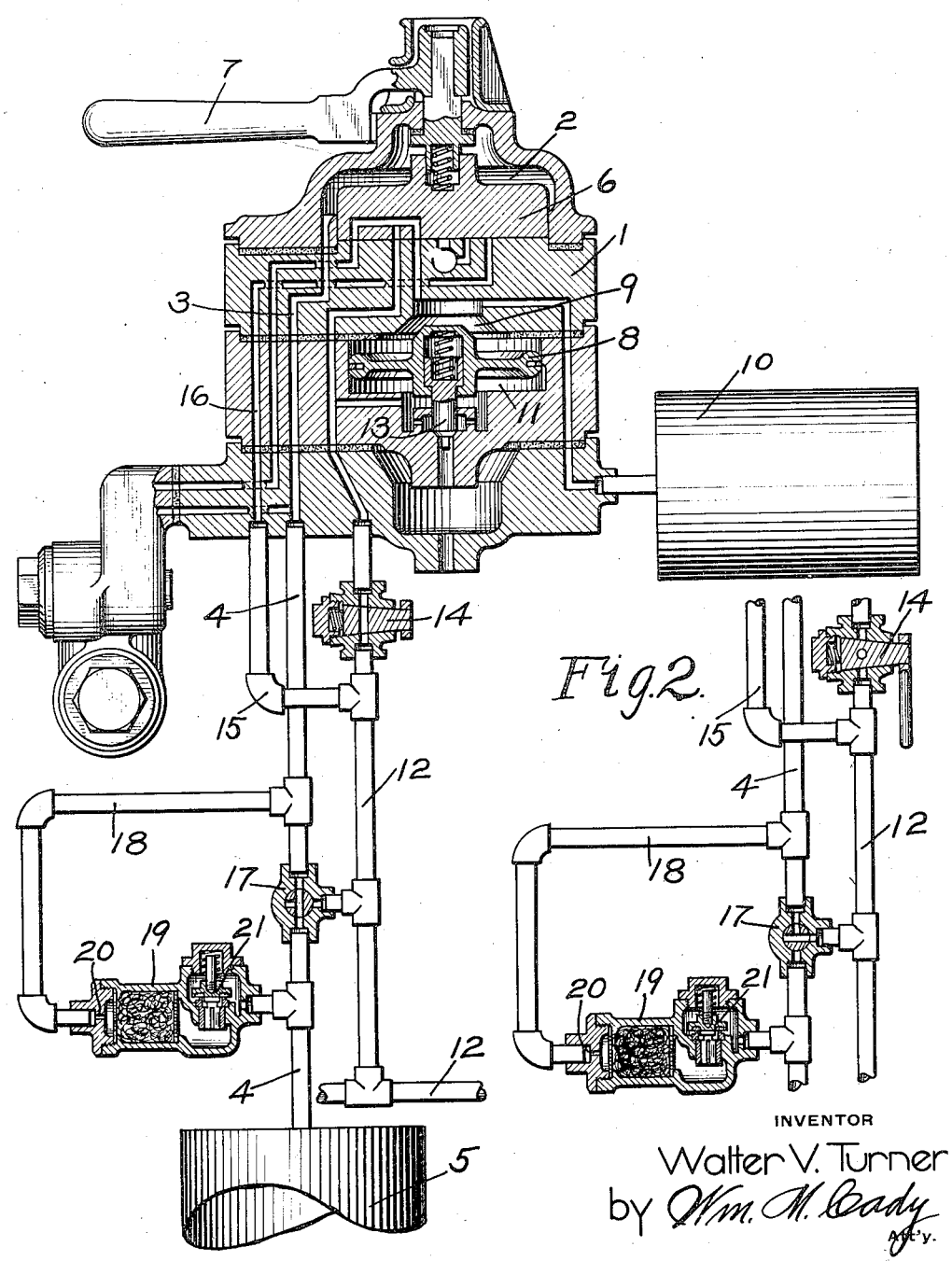

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LOCOMOTIVE-BRAKE.

1,297,515.  Specification of Letters Patent.  Patented Mar. 18, 1919.

Application filed October 16, 1917. Serial No. 196,930.

*To all whom it may concern:*

Be it known that I, WALTER V. TURNER, a citizen of the United States, residing at Wilkinsburg, in the county of Allegheny and State of Pennsylvania, have invented new and useful Improvements in Locomotive-Brakes, of which the following is a specification.

This invention relates to fluid pressure brakes, and more particularly to a locomotive brake equipment.

Where a locomotive is run as a dead engine in a train, it is customary to operate the brakes on the dead engine with the brakes on the train, so that the brakes on this engine are applied and released according to variations in brake pipe pressure.

This is accomplished by cutting off the brake valve on the dead engine from the brake pipe and by charging the main reservoir from the brake pipe, so that the main reservoir on the dead engine can be employed as a source of supply for applying the brakes.

The main reservoir is charged through a restricted passage, so as to prevent an abnormal drop in brake pipe pressure when the main reservoir is being charged and a check valve is interposed in the charging passage in order to prevent back flow from the main reservoir to the brake pipe where the locomotive is operated as a live engine.

By reason of the restricted charging passage, the main reservoir pressure will be lower than the brake pipe pressure while the main reservoir is being charged and since main reservoir pressure acts on the top of the rotary valve of the brake valve and brake pipe pressure acts beneath the rotary valve, under the above conditions, the rotary valve is liable to be kicked off its seat by the higher brake pipe pressure.

With a single brake pipe connection to the brake valve, the lifting of the rotary valve from its seat can be prevented by simply closing the brake pipe cut out cock under the brake valve where the locomotive is run as a dead engine, but it has also been proposed to provide an additional brake pipe connection to the brake valve which is always open, so that the brake pipe pressure can be reduced in the emergency position of the brake valve even if the brake pipe cut out cock be closed.

It will, therefore, be evident that where this additional brake pipe connection is employed, there is no means for preventing the possible lifting of the rotary valve from its seat when the brake pipe pressure is higher than main reservoir pressure on a dead engine.

The principal object of my invention is to provide means for overcoming the above difficulty.

In the accompanying drawing, Figure 1 is a sectional view of a portion of a locomotive brake equipment, showing my invention applied, with connections made for operating the locomotive as a live engine, and Fig. 2 a view of a portion of the construction shown in Fig. 1, with connections made for operating the locomotive as a dead engine.

As shown in the drawing, there is provided a brake valve device comprising a casing 1 having a valve chamber 2 connected by passage 3 and pipe 4 to main reservoir 5 and containing a rotary slide valve 6 adapted to be operated by handle 7.

The casing 1 may also contain an equalizing discharge valve mechanism comprising a piston 8 having chamber 9 at one side connected to the usual equalizing reservoir 10 and chamber 11 at the opposite side connected to brake pipe 12, the piston 8 controlling a discharge valve 13 for venting fluid from the brake pipe to effect an application of the brakes.

The usual brake pipe connection to the brake valve is provided with a cut out cock 14 and an additional brake pipe connection 15 leads from the brake pipe 12 at a point below the cut out cock 14 to a passage 16 which leads to the seat of the rotary valve 6.

In the main reservoir pipe 4 is provided a three way cock 17 connected to the brake pipe 12 and a by-pass connection 18 is provided around the three way cock and in this connection is interposed a casing 19 having a restricted port 20 through which fluid is supplied from the main reservoir 5 to the brake valve and a check valve 21 for preventing back flow from the main reservoir to the brake pipe.

In operation, when the locomotive is to be operated as a live engine, the cut out cock 14 is turned to open communication through the brake pipe 12 to the brake valve, as shown in Fig. 1 of the drawing, and three way cock 17 is turned so that communication is opened through the main reservoir pipe 4 with the brake pipe 12 cut off. With the above connections, it will be seen that main reservoir pressure is supplied to the rotary valve chamber 2 in the usual manner and that the brakes may be controlled in the customary way by manipulating the brake valve.

If it is desired to operate the locomotive as a dead engine, the cut out cock 14 is turned to the position shown in Fig. 2 of the drawing, so as to cut off the usual communication through the brake pipe for controlling the brakes, but by reason of the additional brake pipe connection 15, the brakes on the engine may be applied, in case the brake valve is turned to emergency position.

The three way cock is turned so that communication is opened from the brake pipe 12 to the main reservoir pipe 4 and when the brake pipe is charged with fluid under pressure, air flows from the brake pipe 12 through the cock 17 to the main reservoir pipe 4 and thence through the by-pass connection 18, the restricted port 20, and past check valve 21, to the main reservoir 5.

It will now be seen that while the main reservoir may be charged to a pressure less than the brake pipe pressure by reason of the restricted port 20, the rotary valve chamber being charged through the three way cock 17 directly from the brake pipe will be subject substantially to brake pipe pressure at all times so that the brake pipe pressure acting below the rotary valve will not have a tendency to lift the valve from its seat.

Having now described my invention, what I claim as new and desire to secure by Letters Patent, is:—

1. In a fluid pressure brake, the combination with a brake pipe and a brake valve having a valve chamber containing a rotary controlling valve and a handle for operating said valve, of means for supplying fluid from the brake pipe to said chamber.

2. In a fluid pressure brake, the combination with a brake pipe, a main reservoir, and a brake valve having a valve chamber containing a controlling valve and adapted to be normally charged from the main reservoir, of means for supplying fluid from the brake pipe directly to said chamber.

3. In a fluid pressure brake, the combination with a brake pipe, a main reservoir, and a brake valve having a valve chamber containing a controlling valve, of means for connecting the brake pipe to said main reservoir through a restricted port and to said valve chamber through a large port.

4. In a fluid pressure brake, the combination with a brake pipe, a main reservoir, and a brake valve having a valve chamber containing a controlling valve, of a cock having one position for connecting the main reservoir to said valve chamber and another position in which the brake pipe is connected to the main reservoir through a restricted port and to said valve chamber through an unrestricted port.

5. In a fluid pressure brake, the combination with a brake pipe, a main reservoir, and a brake valve having a valve chamber containing a controlling valve, and having an always open brake pipe connection leading to the seat of the controlling valve, of means for charging the main reservoir from the brake pipe through a restricted port and said valve chamber through a larger port.

In testimony whereof I have hereunto set my hand.

WALTER V. TURNER.